(12) United States Patent
Li

(10) Patent No.: US 10,622,880 B2
(45) Date of Patent: Apr. 14, 2020

(54) ISOLATED POWER SUPPLY CIRCUIT AND ASSOCIATED CONTROL METHOD

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Cheagdu (CN)

( * ) Notice: Subject to any disclaimer, the term of this patent is extended or adjusted under 35 U.S.C. 154(b) by 0 days.

(21) Appl. No.: 16/186,241

(22) Filed: Nov. 9, 2018

(65) Prior Publication Data
US 2019/0149030 A1     May 16, 2019

(51) Int. Cl.
*H02M 1/00* (2006.01)
*H02M 3/24* (2006.01)
*H02M 3/335* (2006.01)
*H02M 3/28* (2006.01)

(52) U.S. Cl.
CPC .............. *H02M 1/00* (2013.01); *H02M 3/24* (2013.01); *H02M 3/28* (2013.01); *H02M 2001/008* (2013.01)

(58) Field of Classification Search
CPC ............ H02M 3/335; H02M 3/33523; H02M 3/33569; H02M 1/00; H02M 2001/008; H02M 3/24
See application file for complete search history.

(56) References Cited

U.S. PATENT DOCUMENTS

| | | | | |
|---|---|---|---|---|
| 7,084,839 B2* | 8/2006 | Onozawa | ............. | G09G 3/2085 315/169.1 |
| 8,687,387 B2 | 4/2014 | Li | | |
| 9,312,778 B2* | 4/2016 | Cho | .................... | H02M 3/3376 |
| 9,515,560 B1* | 12/2016 | Telefus | ................. | H02M 3/158 |
| 9,780,689 B2* | 10/2017 | Chen | .................... | H02M 7/217 |
| 9,837,899 B2 | 12/2017 | Li | | |
| 2011/0157929 A1* | 6/2011 | Sun | ........................ | H02M 5/00 363/37 |
| 2014/0268908 A1* | 9/2014 | Zhou | ................... | H02M 7/5381 363/21.03 |
| 2015/0098252 A1* | 4/2015 | Spinella | ............... | H02M 3/005 363/21.01 |
| 2015/0138841 A1* | 5/2015 | Pahlevaninezhad | .... | H02J 3/383 363/17 |
| 2016/0211841 A1* | 7/2016 | Harrison | ................. | H02M 1/44 |

(Continued)

*Primary Examiner* — Jeffrey A Gblende
*Assistant Examiner* — Sisay G Tiku
(74) *Attorney, Agent, or Firm* — Perkins Coie LLP

(57) ABSTRACT

An isolated power supply circuit has a first reference ground, a second reference ground, a power source, a first receiving circuit, a second receiving circuit, a first inverter circuit, a second inverter circuit and an isolated conversion circuit. The first reference ground and the second reference ground are isolated from each other. The first receiving circuit is coupled to the first reference ground. The second receiving circuit is coupled to the second reference ground. The power source provides a first power signal for the first receiving circuit directly. The first inverter circuit and the second inverter circuit receive the first power signal and produce a first inverter signal and a second inverter signal. And the isolated conversion circuit outputs a second power signal to the second receiving circuit based on the first inverter signal and the second inverter signal.

19 Claims, 11 Drawing Sheets

(56) References Cited

U.S. PATENT DOCUMENTS

2017/0117815 A1* 4/2017 Sato ................. H02M 3/33523
2017/0317587 A1   4/2017 Zhang
2018/0175721 A1   6/2018 Li
2018/0175741 A1* 6/2018 Andersen ............ H02M 3/1584
2019/0027950 A1* 1/2019 Carrizales ............... B60L 58/20

* cited by examiner

ISOLATED POWER SUPPLY CIRCUIT AND ASSOCIATED CONTROL METHOD

CROSS-REFERENCE TO RELATED APPLICATIONS

This application claims the benefit of CN application No. 201711122402.9, filed on Nov. 14, 2017, and incorporated herein by reference.

TECHNICAL FIELD

The present invention relates to electrical circuit, more particularly but not exclusively relates to an isolated power supply circuit and associated control method.

BACKGROUND

In the application of electrical systems, there always existing a plurality of electrical circuits coupled to different reference grounds which are isolated from each other, respectively. A traditional method is using different power sources to supply power for each of these electrical circuits, wherein different power sources are coupled to different reference grounds which are isolated from each other. As shown in FIG. 1, an electrical system 001 comprises a first receiving circuit 10 and a second receiving circuit 20. Wherein the first receiving circuit 10 is coupled to a first reference ground GND1, the second receiving circuit 20 is coupled to a second reference ground GND2. A power source P1 is configured to supply a power signal Vdc1 for the first receiving circuit 10, and a power source P2 is configured to supply a power signal Vdc2 for the second receiving circuit 20. Wherein the power source P1 is coupled to the first reference ground GND1, the power source P2 is coupled to the second reference ground GND2. However, this traditional method of using two separate power sources will increase the cost and volume of the electrical system.

SUMMARY

It is one of the objects of the present invention to provide an isolated power supply circuit and associated control method.

One embodiment of the present invention discloses an isolated power supply circuit, comprising: a first reference ground; a second reference ground, wherein the first reference ground and the second reference ground are isolated from each other; a power source, configured to provide a first power signal, and the power source comprises a first terminal and a second terminal, wherein the second terminal is coupled to the first reference ground; a first inverter circuit, comprising a first input terminal, a second input terminal, a third input terminal and an output terminal, wherein the second input terminal is coupled to the first terminal of the power source to receive the first power signal, the third input terminal is coupled to the first reference ground and the second terminal of the power source, and the output terminal of the first inverter is configured to output a first inverter signal; a second inverter circuit, comprising a first input terminal, a second input terminal, a third input terminal and an output terminal, wherein the first input terminal of the second inverter circuit is coupled to the output terminal of the first inverter circuit, the second input terminal of the second inverter circuit is coupled to the first terminal of the power source, the third input terminal of the second inverter circuit is coupled to the second terminal of the power source, and the output terminal of the second inverter circuit is configured to output a second inverter signal; an isolated conversion circuit, configured to provide a second power signal according to the first inverter signal and the second inverter signal, and the isolated conversion circuit is configured to isolate the first reference ground from the second reference ground; and a first receiving circuit, comprising a first terminal and a second terminal, wherein the first terminal of the first receiving circuit is configured to receive the second power signal, and the second terminal of the first receiving circuit is coupled to the second reference ground.

Another embodiment of the present invention discloses an isolated power supply circuit, comprising: a first reference ground; a second reference ground, wherein the first reference ground and the second reference ground are isolated from each other; a power source, configured to provide a first power signal, and the power source comprises a first terminal and a second terminal, wherein the second terminal is coupled to the first reference ground; an inverter circuit, coupled between the power source and the first reference ground, and the inverter circuit is configured to receive the first power signal and provide an inverter signal of the first power signal; a power conversion circuit, coupled between the power source and the first reference ground, and the power conversion circuit is configured to convert the first power signal to a second power supply signal, an isolated conversion circuit, configured to provide a second power signal according to the second power supply signal and the inverter signal of the first power signal, and the isolated conversion circuit is configured to isolate the first reference ground from the second reference ground; and a receiving circuit, comprising a first terminal and a second terminal, wherein the first input terminal of the receiving circuit is configured to receive the second power signal, and the second terminal of the receiving circuit is coupled to the second reference ground.

Yet another embodiment of the present invention discloses a control method for an isolated power supply circuit, wherein the isolated power supply circuit comprises a first reference ground, a second reference ground, a power source configured to provide a first power signal and a receiving circuit, the control method comprising: receiving the first power signal from the power source by the receiving circuit, wherein both the receiving circuit and the power source are coupled to the first reference ground; converting the first power signal to a first inverter signal by a first inverter circuit, and generating a second inverter signal by a second inverter circuit based on the first inverter signal, wherein the second inverter circuit is coupled to an output terminal of the first inverter circuit; controlling the first inverter signal and the second inverter signal by an inverter control signal; and receiving the first inverter signal and the second inverter signal through an isolated conversion circuit which is coupled to the first inverter circuit, and producing a second power signal by the isolated conversion circuit based on the first inverter signal and the second inverter signal, wherein the isolated conversion circuit is also configured to isolate the first reference ground from a second reference ground.

According to the embodiments of the present invention, the isolated power supply circuit can supply power for multiple receiving circuits coupled to isolated reference grounds with one power source.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are described to provide a thorough understanding of the present invention, such as examples of circuits, components, and methods. These embodiments illustrated are exemplary, not to confine the scope of the invention. A person ordinarily skilled in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

Figure 1:
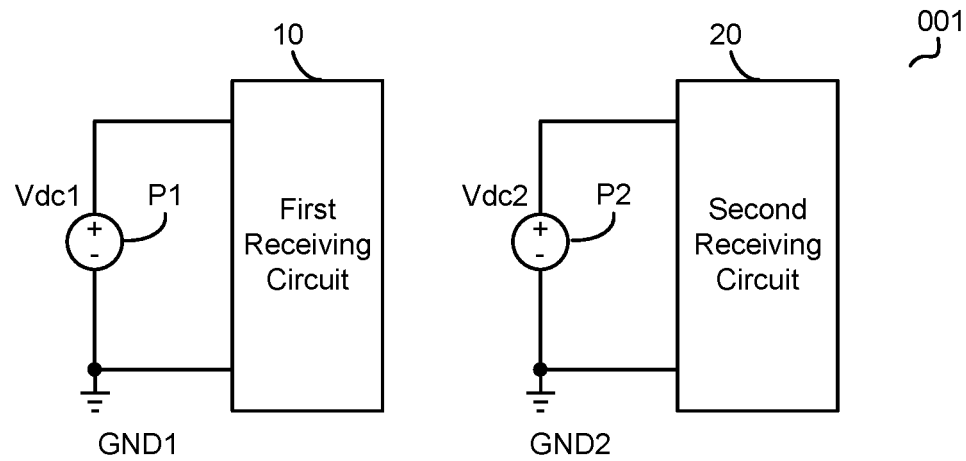
FIG. 1 schematically illustrates a circuit block of a traditional power supply circuit 001 according to an embodiment of the present invention.
Figure 2:
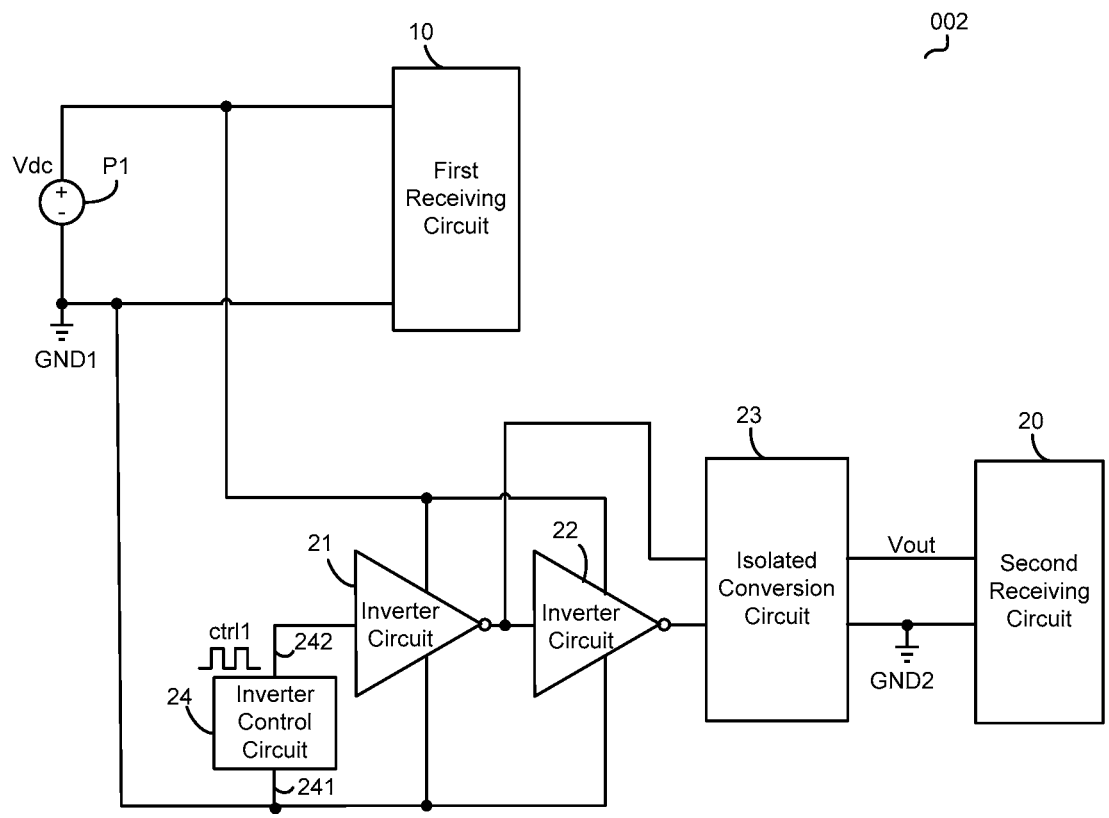
FIG. 2 schematically illustrates a circuit block of an isolated power supply circuit 002 according to an embodiment of the present invention.

FIG. 2 schematically illustrates a circuit block of an isolated power supply circuit 002 according to an embodiment of the present invention. The isolated power supply circuit 002 comprises: a first reference ground GND1, a second reference ground GND2, a power source P1 configured to supply a first power signal Vdc, a first receiving circuit 10 coupled to the first reference ground GND1, a second receiving circuit 20 coupled to the second reference ground GND2, a first converter circuit 21, a second converter circuit 22, an inverter control circuit 24, and an isolated conversion circuit 23. Wherein the first reference ground GND1 and the second reference ground GND2 are isolated from each other.

In the embodiment illustrated in FIG. 2, the power source P1 comprises a first terminal and a second terminal, wherein the second terminal is coupled to the first reference ground GND1. The first receiving circuit 10 comprises a first terminal and a second terminal, wherein the first terminal of the first receiving circuit 10 is coupled to the first terminal of the power source P1 to receive the first power signal Vdc, and the second terminal of the first receiving circuit 10 is coupled to the first reference ground GND1 and the second terminal of the power source P1.

In the embodiment illustrated in FIG. 2, the inverter control circuit 24 is configured to produce an inverter control signal ctrl1 to control the first inverter circuit 21. The inverter control circuit 24 comprises a first terminal 241 and a second terminal 242, wherein the first terminal 241 is coupled to the first reference circuit GND1 and the second terminal of the power source P1. In one embodiment, the inverter control signal ctrl1 is configured to a square signal. The first inverter circuit 21 comprises a first input terminal, a second input terminal, a third input terminal and an output terminal. The first input terminal of the first inverter circuit 21 is coupled to the second terminal 242 of the inverter control circuit 24 to receive the inverter control signal ctrl1. The second input terminal of the first inverter circuit 21 is coupled to the first terminal of the power source P1 to receive the first power signal Vdc. The third input terminal of the first inverter circuit 21 is coupled to the first reference ground GND and the second terminal of the power source P1. The output terminal of the first inverter circuit 21 is configured to output a first inverter signal. In one embodiment, the second inverter circuit 22 comprises a first input terminal, a second input terminal, a third input terminal and an output terminal. Wherein the first input terminal of the second inverter circuit 22 is coupled to the output terminal of the first inverter circuit 21 to receive the first inverter signal. The second input terminal of the second inverter circuit 22 is coupled to the first terminal of the power source P1 to receive the first power signal Vdc. The third input terminal of the second inverter circuit 22 is coupled to the first reference ground GND1 and the second terminal of the power source P1. The output terminal of the second inverter circuit 22 is configured to output a second inverter signal. In the embodiment illustrated in FIG. 2, the isolated conversion circuit 23 is configured to produce a second power signal Vout according to the first inverter signal and the second inverter signal. The isolated conversion circuit 23 comprises a first input terminal, a second input terminal, a first output terminal and a second output terminal. The first input terminal of the isolated conversion circuit 23 is coupled to the output terminal of the first inverter circuit 21 to receive the first inverter signal. The second input terminal of the isolated conversion circuit 23 is coupled to the output terminal of the second inverter circuit 22 to receive the second inverter signal. The first output terminal of the isolated conversion circuit 23 is configured to output the second power signal Vout. The second output terminal of the isolated conversion circuit 23 is coupled to the second reference ground GND2. The isolated conversion circuit 23 is also configured to isolate the first reference ground GND1 from the second reference ground GND2. In one embodiment, the second receiving circuit 20 comprises a first terminal and a second terminal. The first terminal of the second receiving circuit 20 is coupled to the first output terminal of the isolated conversion circuit 23 to receive the second power signal Vout, the second terminal of the second receiving circuit 20 is coupled to the second reference ground GND2 and the second output terminal of the isolated conversion circuit 23.

In the embodiment illustrated in FIG. 2, the power source P1 is configured to supply power for both the first receiving circuit 10 and the second receiving circuit 20. Wherein the first receiving circuit 10 and the second receiving circuit 20 are coupled to different reference grounds which are isolated from each other, thus reducing the cost and the volume of the electrical system.

Figure 3:
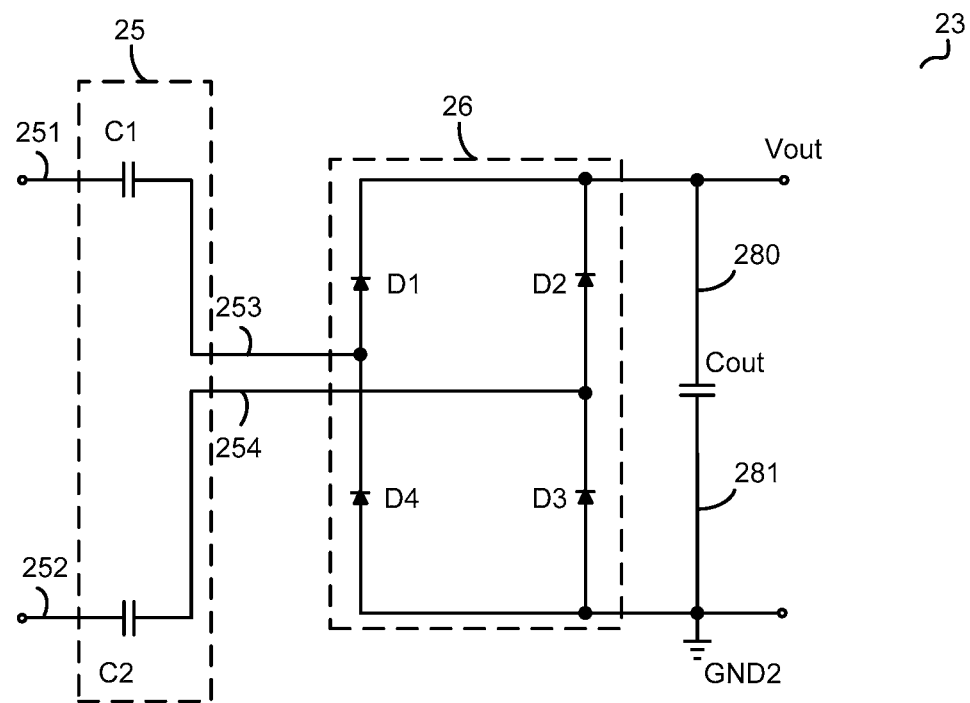
FIG. 3 schematically illustrates an isolated conversion circuit 23 shown in FIG. 2 according to an embodiment of the present invention.

FIG. 3 schematically illustrates an isolated conversion circuit 23 shown in FIG. 2 according to an embodiment of the present invention. The isolated conversion circuit 23 comprises an isolated circuit 25, a rectifier circuit 26 and an output capacitor Cout. The output capacitor Cout comprises a first terminal 280 and a second terminal 281, wherein the output capacitor Cout is configured to provide the second power signal Vout. In one embodiment, the isolated circuit 25 comprises a first capacitor C1 and a second capacitor C2. The first capacitor C1 comprises a first terminal 251 and a second terminal 253, wherein the first terminal 251 of the first capacitor C1 is coupled to the first input terminal of the isolated conversion circuit 23 and the output terminal of the first inverter circuit 21. The second capacitor C2 comprises a first terminal 252 and a second terminal 254, wherein the first terminal 252 is configured to be the second input terminal of the isolated conversion circuit 23 and the output terminal of the second inverter circuit 22. In one embodiment, the isolated circuit 25 is configured to isolate the first reference ground GND1 from the second reference ground GND2. The rectifier circuit 26 comprises a first input terminal, a second input terminal, a first output terminal and a second output terminal. The first input terminal of the rectifier circuit 26 is coupled to the first output terminal 253 of the isolated circuit 25 to receive the isolated first inverter signal, and the second input terminal of the rectifier circuit 26 is coupled to the second output terminal 254 of the isolated circuit 25 to receive the isolated second inverter signal. In one embodiment, the rectifier circuit 26 comprises a first diode D1, a second diode D2, a third diode D3 and a fourth diode D4. Wherein the first diode D1 comprises an anode and a cathode, the second diode D2 comprises an anode and a cathode, the third diode D3 comprises an anode and a cathode, and the fourth diode D4 comprises an anode and a cathode. Both the anode of the first diode D1 and the cathode of the fourth diode D4 are coupled to the second terminal 253 of the first capacitor. Both the anode of the second diode D2 and the cathode of the third diode D3 are coupled to the second terminal 254 of the second capacitor C2. Both the cathode of the first diode D1 and the cathode of the second diode D2 are coupled to the first input terminal of the second receiving circuit 20. Both the anode of the third diode D3 and the anode of the fourth diode D4 are coupled to the second reference GND2 and the second input terminal of the second receiving circuit 20. The first terminal 280 of the output capacitor Cout is coupled to the first input terminal of the second receiving circuit 20 and the first output terminal of the rectifier circuit. The second terminal 281 of the output capacitor Cout is coupled to the second reference ground GND2 and the second input terminal of the second receiving circuit 20.

Figure 4:
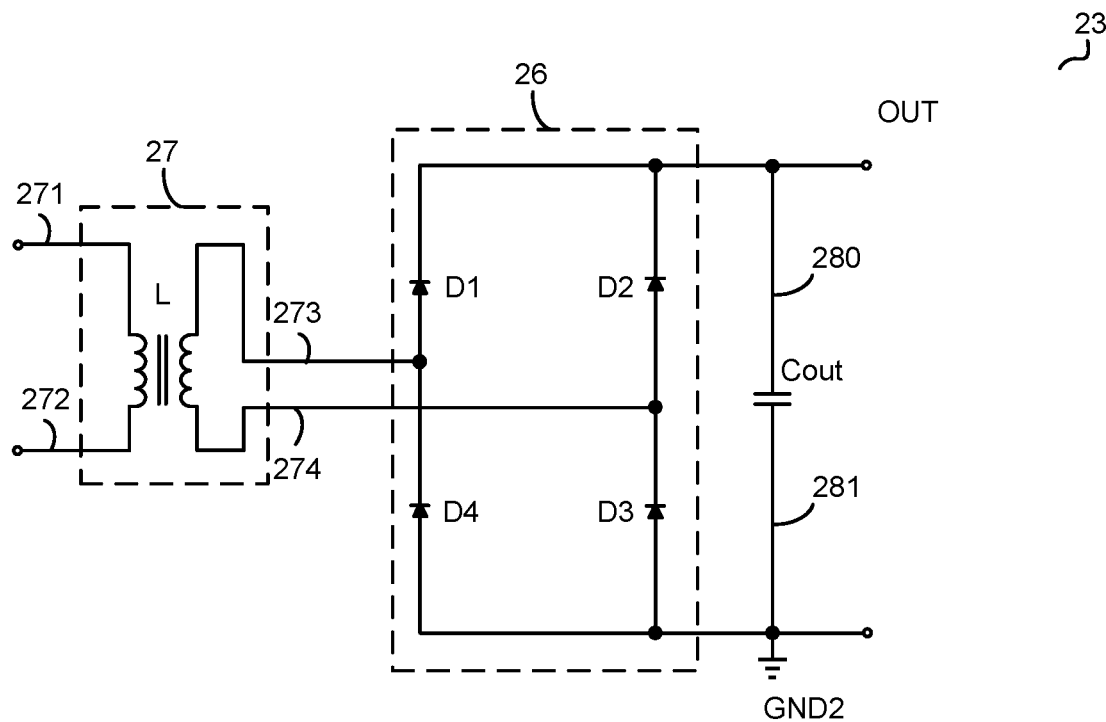
FIG. 4 schematically illustrates an isolated conversion circuit 23 shown in FIG. 2 according to another embodiment of the present invention.

FIG. 4 schematically illustrates an isolated conversion circuit 23 shown in FIG. 2 according to another embodiment of the present invention. Differences between the isolated conversion circuit 23 illustrated in FIG. 4 and the isolated conversion circuit 23 illustrated in FIG. 4 are shown as below. The isolated conversion circuit 23 illustrated in FIG. 4 comprises an isolated circuit 27, wherein the isolated circuit 27 comprises a first input terminal 271, a second input terminal 272, a first output terminal 273 and a second output terminal 274. The first input terminal 271 is coupled to the output terminal of the first inverter circuit 21. The second input terminal 272 is coupled to the output terminal of the second inverter circuit 22. The first output terminal 273 is configured to output the isolated first inverter signal. The second output terminal 274 is configured to output the isolated second inverter signal. In one embodiment, the isolated circuit 27 comprises an isolated transformer L.

Figure 5:
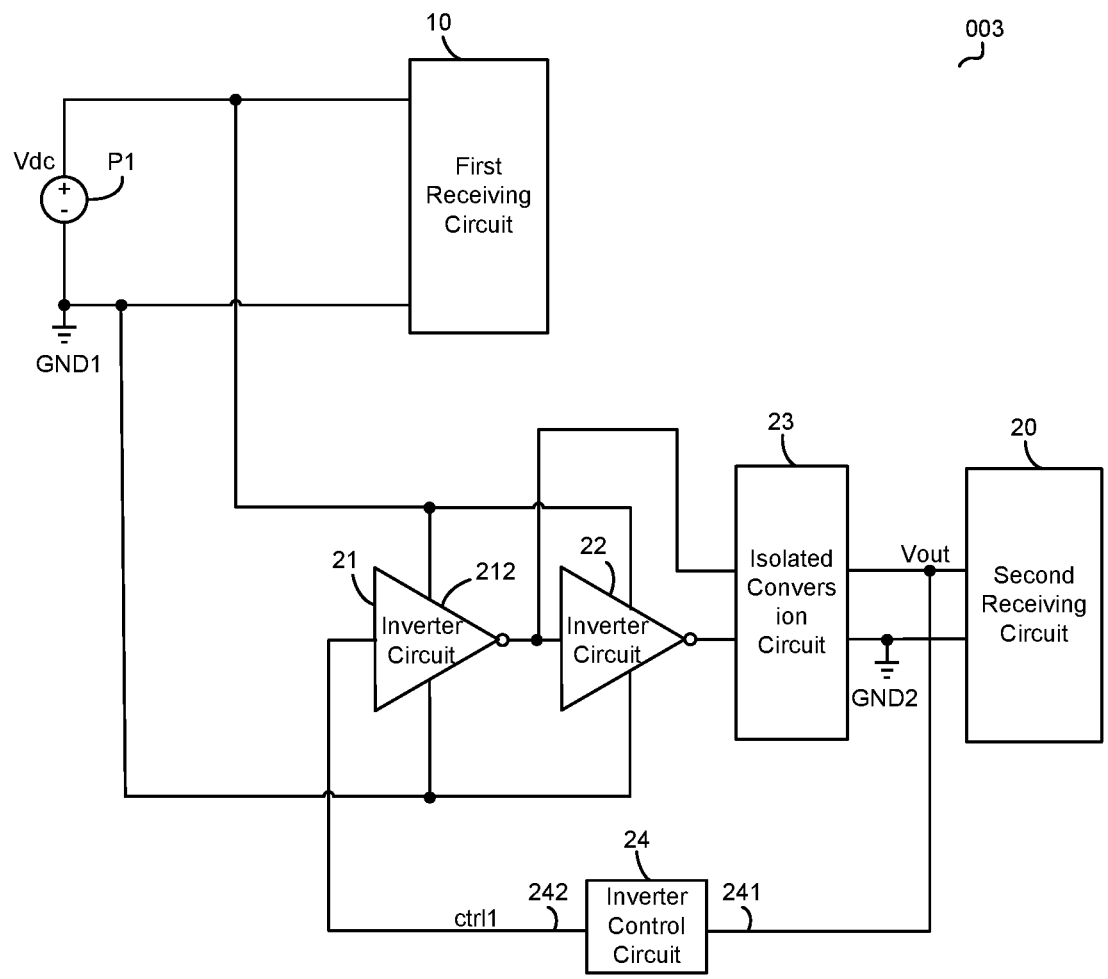
FIG. 5 schematically illustrates a circuit block of an isolated power supply circuit 003 according to an embodiment of the present invention.

FIG. 5 schematically illustrates a circuit block of an isolated power supply circuit 003 according to an embodiment of the present invention. Differences between the isolated power supply circuit 003 illustrated in FIG. 5 and the power supply circuit 002 illustrated in FIG. 2 are shown as below. The isolated power supply circuit 003 comprises an inverter control circuit 24. The inverter control circuit 24 comprises a first terminal 241 and a second terminal 242, wherein the first terminal 241 is coupled to the first output terminal of the isolated conversion circuit 23 to receive the second power source Vout, and the second terminal 242 is configured to output the inverter control signal ctrl1. In one embodiment, when the second power signal Vout is greater than a preset value Value, the inverter control signal ctrl1 is configured to be a fixed value, e.g, digital high or digital low, to control the first inverter signal unchanged, while the second inverter signal is unchanged, and the isolated conversion circuit 23 is configured to stop working. When the second power signal Vout is less than the preset value Value, the inverter control signal ctrl1 is configured to be a square signal, the isolated conversion circuit 23 is configured to start working. So that the second power signal Vout is configured to be a steady value Value with controllable ripple waves.

Figure 6:
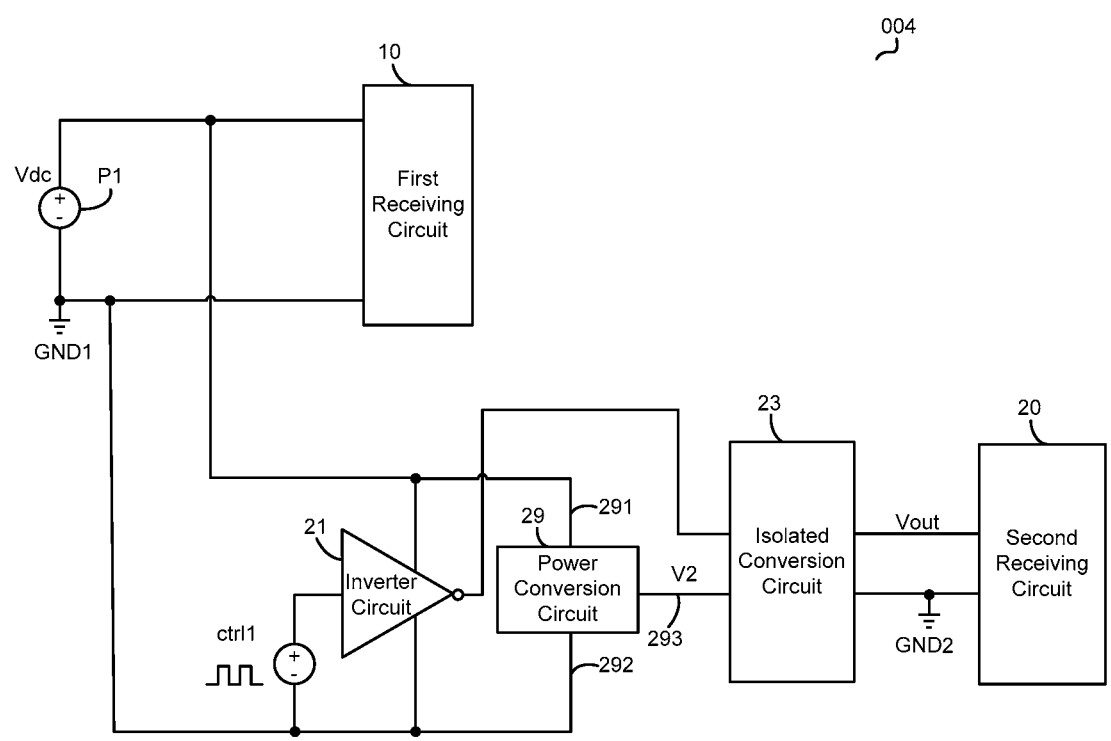
FIG. 6 schematically illustrates a circuit block of an isolated power supply circuit 004 according to an embodiment of the present invention.

FIG. 6 schematically illustrates a circuit block of an isolated power supply circuit 004 according to an embodiment of the present invention. Differences between the isolated power supply circuit 004 illustrated in FIG. 6 and the isolated power supply circuit 002 illustrated in FIG. 2 are shown as below. The isolated power supply circuit 004 comprises a power conversion circuit 29, wherein the power conversion circuit 29 is configured to produce a second power supply signal V2 according to the first power signal Vdc. The power conversion circuit 29 comprises a first input terminal 291, a second input terminal 292 and an output terminal 293. Wherein the first input terminal 291 is coupled to the first terminal of the power source P1 to receive the first power signal Vdc. The second input terminal 292 is coupled to the first reference ground GND1 and the second terminal of the power source P1. The output terminal 293 is coupled to the second input terminal of the isolated conversion circuit 23 to output the second power supply signal V2. In one embodiment, the first input terminal of the isolated conversion circuit 23 is configured to receive the first inverter signal of the first inverter circuit 21, the second input terminal of the isolated conversion circuit 23 is configured to receive the second power supply signal V2. The isolated conversion circuit 23 is configured to produce the second power signal Vout according to the first inverter signal and the second power supply signal V2.

Figure 7:
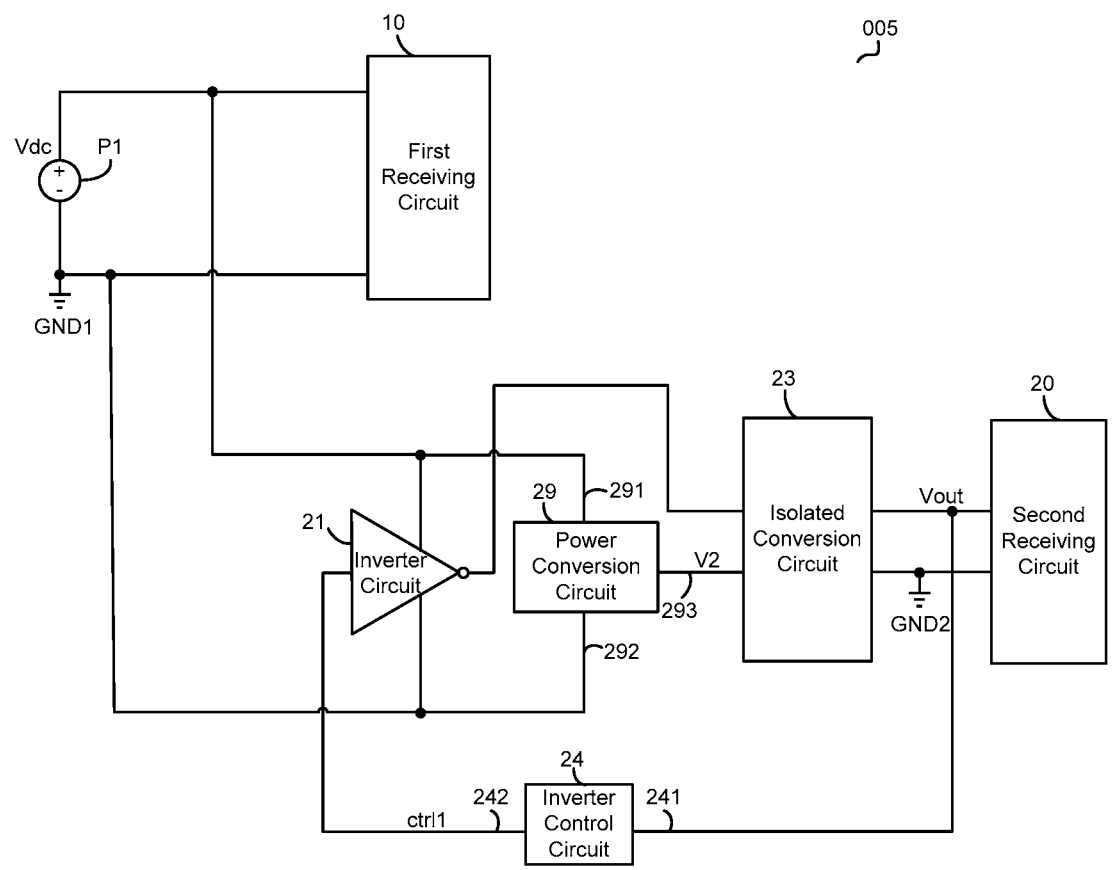
FIG. 7 schematically illustrates a circuit block of an isolated power supply circuit 005 according to an embodiment of the present invention.

FIG. 7 schematically illustrates a circuit block of an isolated power supply circuit 005 according to an embodiment of the present invention. Differences between the isolated power supply circuit 005 illustrated in FIG. 7 and the isolated power supply circuit 004 illustrated in FIG. 6 are shown as below. The isolated power supply circuit 005 comprises the converter control circuit 24, wherein the first terminal 241 of the inverter control circuit 24 is coupled to the first output terminal of the isolated conversion circuit 23 to receive the second power signal Vout, the second terminal 242 is configured to output the inverter control signal ctrl1. The inverter control circuit 24 is configured to produce the inverter control signal ctrl1 according to the second power signal Vout. In one embodiment, when the second power signal Vout is greater than the preset value Value, the inverter control signal ctrl1 is configured to be a fixed value, e.g. digital high or digital low, to control the first inverter signal unchanged, while the second inverter signal is unchanged, and the isolated conversion circuit 23 is configured to stop working. When the second power signal Vout is less than the preset value Value, the inverter control signal ctrl1 is configured to be a square signal, and the isolated conversion circuit 23 is configured to start working. So that the second power signal Vout is configured to be a steady value Value with controllable ripple waves.

Figure 8:
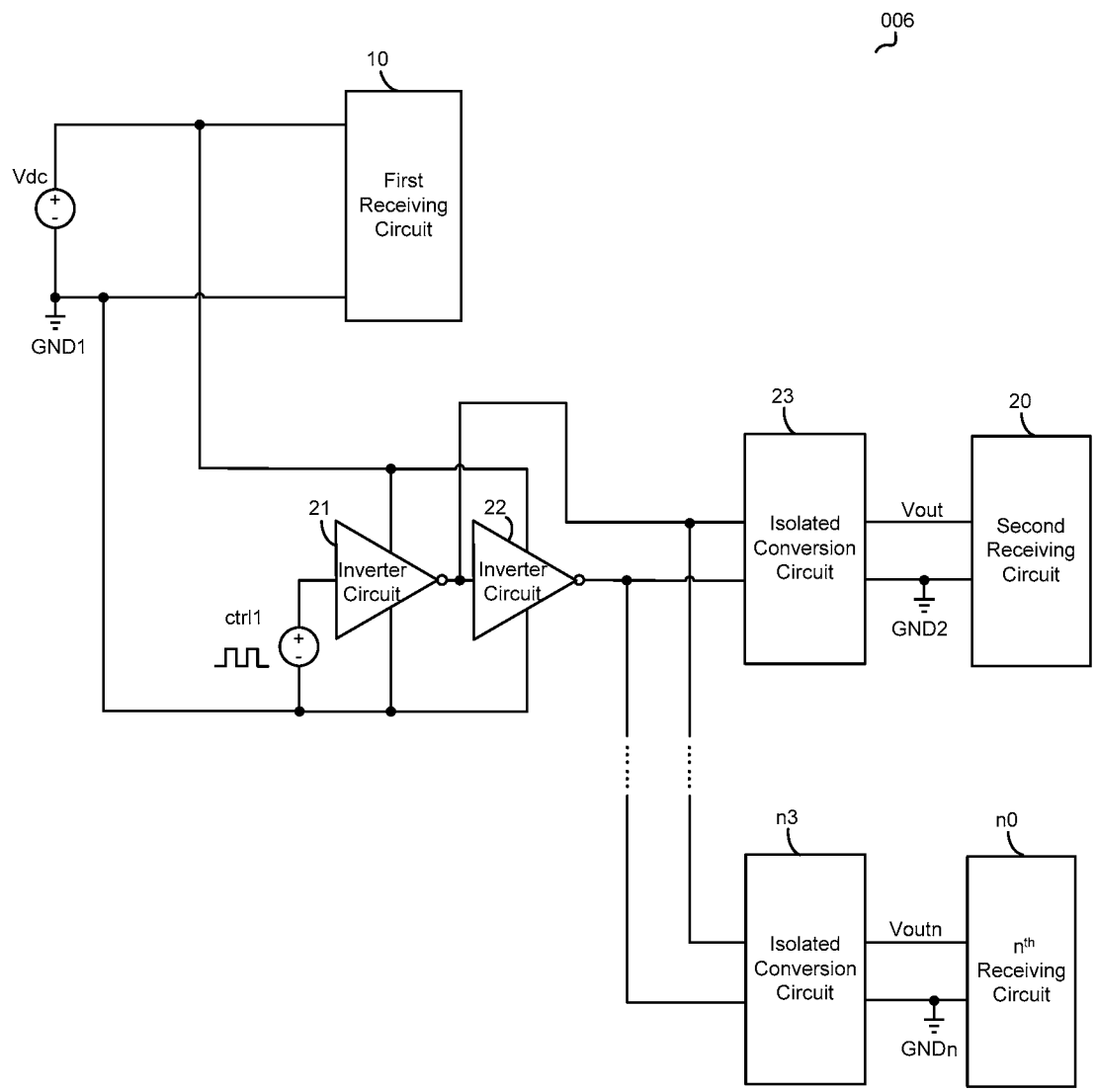
FIG. 8 schematically illustrates a circuit block of an isolated power supply circuit 006 according to an embodiment of the present invention.

FIG. 8 schematically illustrates a circuit block of an isolated power supply circuit 006 according to an embodiment of the present invention. Differences between the isolated power supply circuit 006 illustrated in FIG. 8 and the isolated power supply circuit 002 illustrated in FIG. 2 are shown as below. The isolated power supply circuit 006 illustrated in FIG. 8 further comprises a plurality of receiving circuits coupled to different reference grounds which are isolated from each other, e.g. a third receiving circuit and a fourth receiving circuit. The plurality of the receiving circuits are shown as an nth receiving circuit in FIG. 8, wherein n is a natural number greater than or equal to 3. The isolated power supply circuit 006 further comprises a plurality of isolated reference grounds, e.g. a third reference ground and a fourth reference ground. The plurality of the isolated reference grounds are shown as an nth reference ground GNDn in FIG. 8, wherein n is a natural number greater than or equal to 3. The isolated power supply circuit 006 further comprises a plurality of isolated conversion circuits coupled to the different reference grounds which are isolated from each other, e.g. an isolated conversion circuit 33 and an isolated conversion circuit 43. The plurality of the isolated conversion circuits are shown as an isolated conversion circuit n3, wherein n is a natural number greater than or equal to 3. In one embodiment, the isolated conversion circuit n3 comprises a first input terminal, a second input terminal, a first output terminal and a second output terminal. Wherein the first input terminal of the isolated circuit n3 is coupled to the output terminal of the first inverter circuit 21 to receive the first inverter signal. The second input terminal of the isolated circuit n3 is coupled to the output terminal of the second inverter circuit 22 to receive the second inverter signal. The isolated conversion circuit n3 is configured to output an nth power signal Voutn according to the first inverter signal and the second inverter signal The isolated conversion circuit n3 is also configured to isolate the first reference ground GND1 from the nth reference ground GNDn. The nth receiving circuit n0 comprises a first input terminal and a second input terminal. Wherein the first input terminal of the nth receiving circuit n0 is coupled to the first output terminal of the isolated conversion circuit n3 to receive the nth power signal Voutn, and the second input terminal of the nth receiving circuit n0 is coupled to the nth reference ground GNDn and the second output terminal of the isolated conversion circuit n3. The isolated power supply circuit 006 is configured to use one power source to supply power for the n receiving circuits coupled to the n reference grounds which are isolated from each other, thus reducing the cost and volume of the electrical system, wherein n is a natural number greater than or equal to 3.

Figure 9:
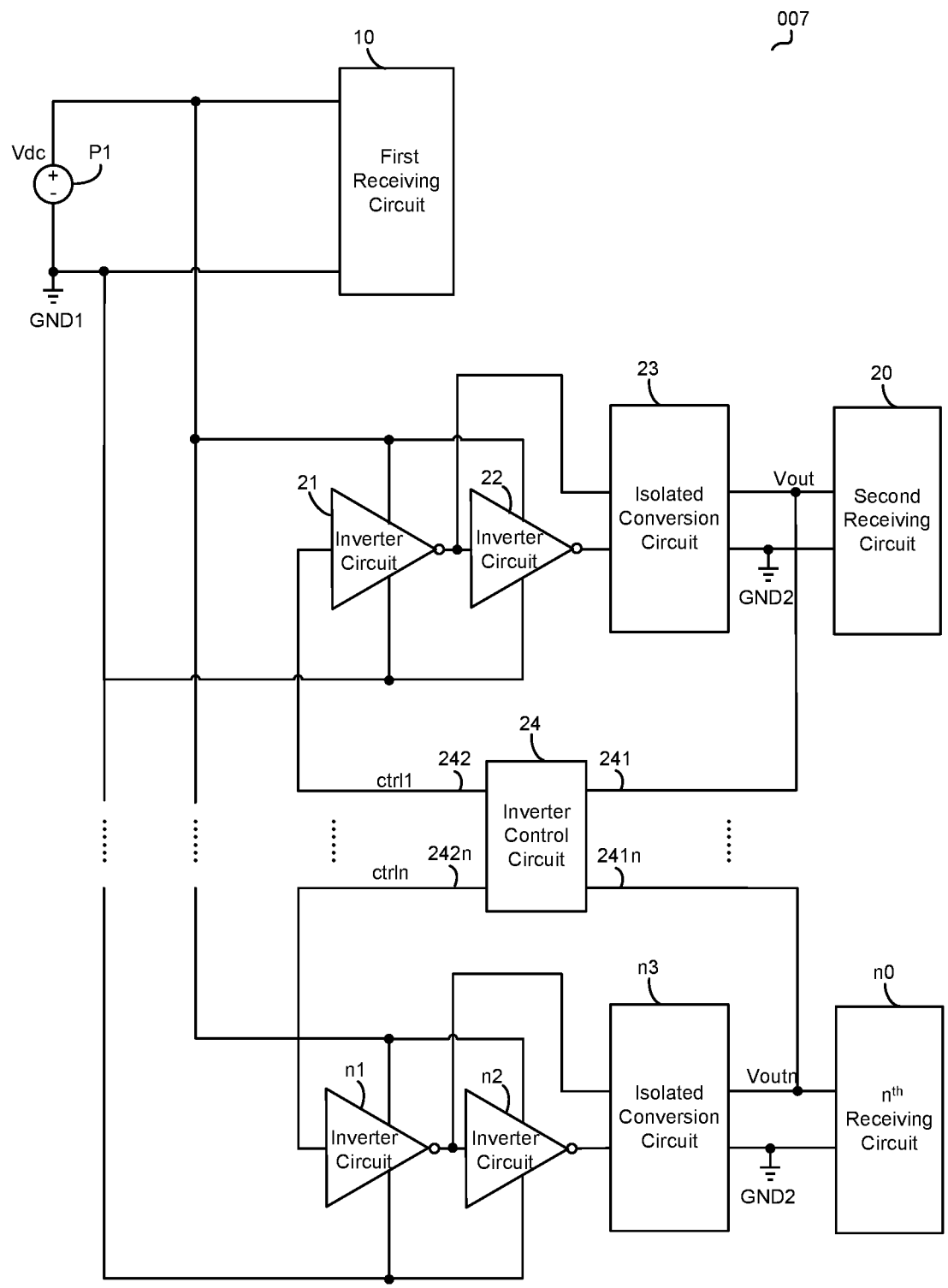
FIG. 9 schematically illustrates a circuit block of an isolated power supply circuit 007 according to an embodiment of the present invention.

FIG. 9 schematically illustrates a circuit block of an isolated power supply circuit 007 according to an embodiment of the present invention. Differences between the isolated power supply circuit 007 illustrated in FIG. 9 and the isolated power supply circuit 003 illustrated in FIG. 5 are shown as below. The isolated power supply circuit 007 illustrated in FIG. 9 further comprises other reference grounds besides the first reference ground GND1 and the second reference ground GND2, wherein the other reference grounds are shown as the nth reference ground GNDn in FIG. 9. The isolated power supply circuit 007 further comprises other inverter circuits besides the first inverter circuit 21 and the second inverter circuit 22, wherein the other inverter circuits are shown as an inverter circuit n1 and an inverter circuit n2 in FIG. 9. The isolated power supply circuit 007 further comprises other inverter control signals besides the inverter control signal ctrl1, wherein the other inverter control signals are shown as an inverter signal ctrln in FIG. 9. The isolated power supply circuit 007 further comprises other isolated conversion circuits besides the isolated conversion circuit 23, wherein the other isolated conversion circuits are shown as an isolated conversion circuit n3 in FIG. 9. The isolated power supply circuit 007 further comprises other receiving circuits coupled to other reference grounds which are isolated from each other besides the first receiving circuit 10 and the second receiving circuit 20, wherein the other receiving circuits are shown as the nth receiving circuit n0 in FIG. 9. The isolated power supply circuit 007 is further configured to produce other power signals besides the second power signal Vout, wherein the other power signals are shown as the nth power signal Voutn in FIG. 9. Wherein n is a natural number greater than or equal to 3.

In the embodiment illustrated in FIG. 9, the isolated power supply circuit 007 comprises the inverter control circuit 24. Wherein the inverter control circuit 24 comprises other terminals besides the first terminal 241 and the second terminal 242, and the other terminals are shown as a terminal 242n and a terminal 241n in FIG. 9, wherein n is a natural number greater than or equal to 3. The terminal 241n is coupled to the first output terminal of the isolated conversion circuit n3 to receive the nth power signal Voutn, the terminal 242n is configured to output the inverter control signal ctrln, and the inverter control circuit 24 is configured to produce the inverter control signal ctrln according to the nth power signal Voutn. In one embodiment, when the nth power signal Voutn is greater than a preset value Valuen, the inverter control signal ctrln is configured to be a fixed value, e.g. digital high or digital low, to control an inverter signal of the inverter circuit n1 unchanged, while an inverter signal of the inverter circuit n2 is unchanged, and the isolated conversion circuit n3 is configured to stop working. When the nth power signal Voutn is less than the preset value Valuen, the inverter control signal ctrln is configured to be a square signal, the isolated conversion circuit n3 is configured to start working. So that the nth power signal Voutn is configured to be a steady value Valuen with controllable ripple waves.

In the embodiment illustrated in FIG. 9, the inverter circuit n1 comprises a first input terminal, a second input terminal, a third input terminal and an output terminal. Wherein the first terminal of the inverter circuit n1 is coupled to the terminal 242n of the inverter control circuit 24 to receive the inverter control signal ctrln. The second terminal of the inverter circuit n1 is coupled to the first terminal of the power source P1 to receive the first power signal Vdc. The third input terminal of the inverter circuit n1 is coupled to the first reference ground GND1 and the second terminal of the power source P1. The output terminal of the inverter circuit n1 is configured to output the inverter signal of the inverter circuit n1. In one embodiment, the inverter circuit n2 comprises a first input terminal, a second input terminal, a third input terminal and an output terminal. Wherein the first input terminal of the inverter circuit n2 is coupled to the output terminal of the inverter circuit n1 to receive the inverter signal of the inverter circuit n1. The second input terminal of the inverter circuit n2 is coupled to the first terminal of the power source P1 to receive the first power signal Vdc. The third input terminal of the inverter circuit n2 is coupled to the first reference ground GND1 and the second terminal of the power source P1. The output terminal of the inverter circuit n2 is configured to output the inverter signal of the inverter circuit n2.

In one embodiment, the isolated conversion circuit n3 comprises a first input terminal, a second input terminal, a first output terminal and a second output terminal. Wherein the first input terminal of the isolated conversion circuit n3 is coupled to the output terminal of the inverter circuit n1 to receive the inverter signal of the inverter circuit n1. The second input terminal of the isolated conversion circuit n3 is coupled to the output terminal of the inverter circuit n2 to receive the inverter signal of the inverter circuit n2. The isolated conversion circuit n3 is configured to produce the nth power signal Voutn according to the inverter signal of the inverter circuit n1 and the inverter signal of the inverter circuit n2. The first output terminal of the isolated conversion circuit n3 is configured to output the nth power signal Voutn. The second output terminal of the isolated conversion circuit n3 is coupled to the nth reference ground GNDn. The isolated conversion circuit n3 is also configured to isolate the first reference ground GND1 from the nth reference ground GNDn. In one embodiment, the nth receiving circuit n0 comprises a first terminal and a second terminal. Wherein the first terminal of the nth receiving circuit n0 is coupled to the first output terminal of the isolated conversion circuit n3 to receive the nth power signal Voutn. And the second terminal of the nth receiving circuit n0 is coupled to the nth reference ground GNDn and the second output terminal of the isolated conversion circuit n3.

Figure 10:
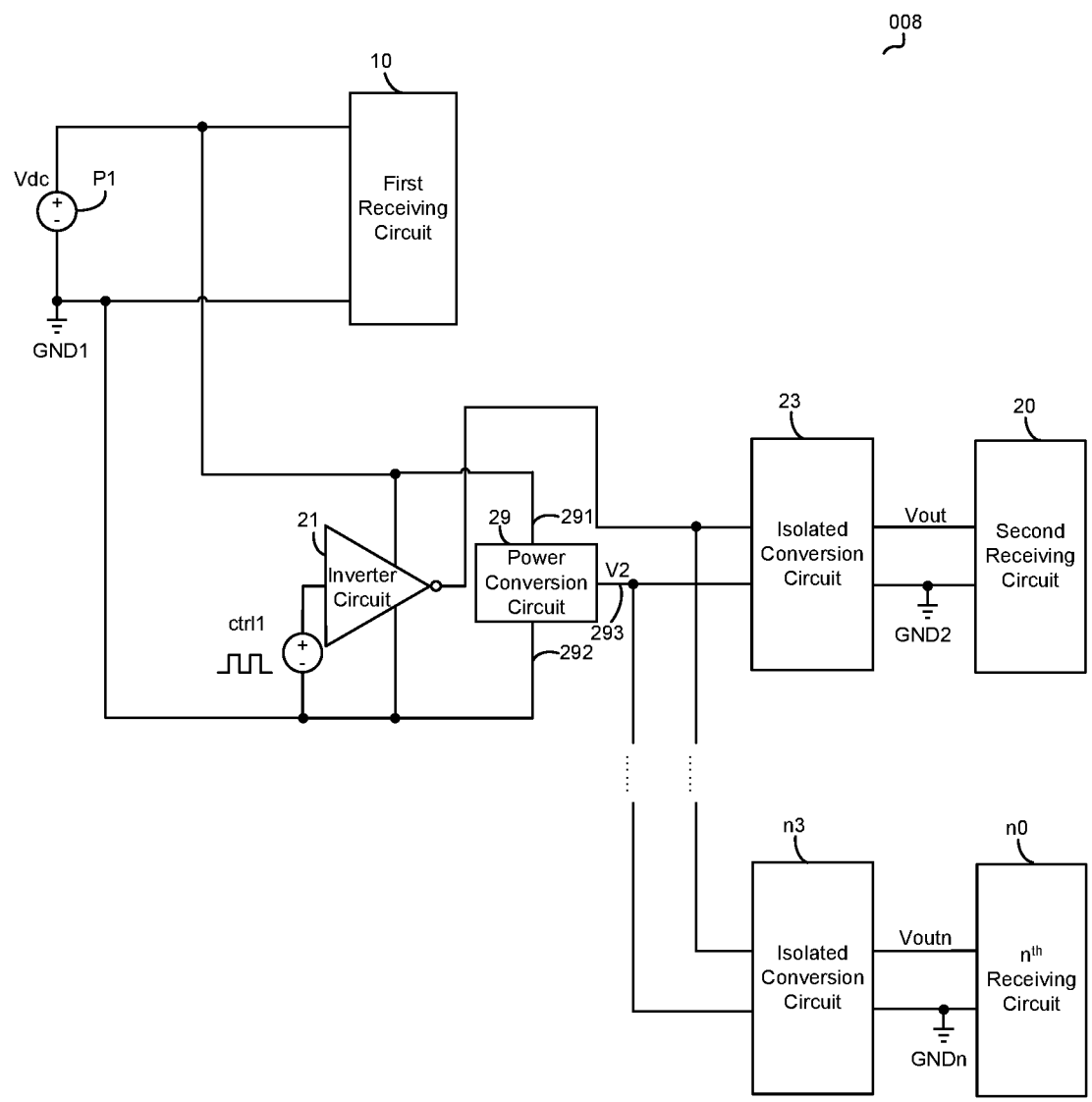
FIG. 10 schematically illustrates a circuit block of an isolated power supply circuit 008 according to an embodiment of the present invention.

FIG. 10 schematically illustrates a circuit block of an isolated power supply circuit 008 according to an embodiment of the present invention. Differences between the isolated power supply 008 illustrated in FIG. 10 and the isolated power supply circuit 006 illustrated in FIG. 8 are shown as below. The isolated power supply 008 illustrated in FIG. 10 comprises the power conversion circuit 29, wherein the power conversion circuit 29 is configured to produce the second power supply signal V2 according to the first power signal Vdc. The power conversion circuit 29 comprises the first input terminal 291, the second input terminal 292 and the output terminal 293. Wherein the first input terminal 291 is coupled to the first terminal of the power source P1 to receive the first power signal Vdc. The second input terminal 291 is coupled to the first reference ground GND1 and the second terminal of the power source P1. The output terminal 293 is coupled to the second input terminal of the isolated conversion circuit 23 to output the second power supply signal V2. In the embodiment illustrated in FIG. 10, the input terminal of the isolated conversion circuit 23 is configured to receive the second power supply signal V2 and the first inverter signal. The isolated conversion circuit 23 is configured to produce the second power signal according to the second power supply signal V2 and the first inverter signal. The first input terminal of the isolated conversion circuit n3 is configured to receive the first inverter signal. The second input terminal of the isolated conversion circuit n3 is coupled to the output terminal 293 of the power conversion circuit 29 to receive the second power supply signal V2. The isolated conversion circuit n3 is configured to produce the nth power signal Voutn according to the second power supply signal V2 and the first inverter signal. The second output terminal of the isolated conversion circuit n3 is coupled to the nth reference ground GNDn. In one embodiment, the first input terminal of the nth receiving circuit n0 is coupled to the first output terminal of the isolated conversion circuit n3 to receive the nth power signal Voutn. And the second input terminal of the nth receiving circuit n0 is coupled to the nth reference ground GNDn and the second output terminal of the isolated conversion circuit n3.

Figure 11:
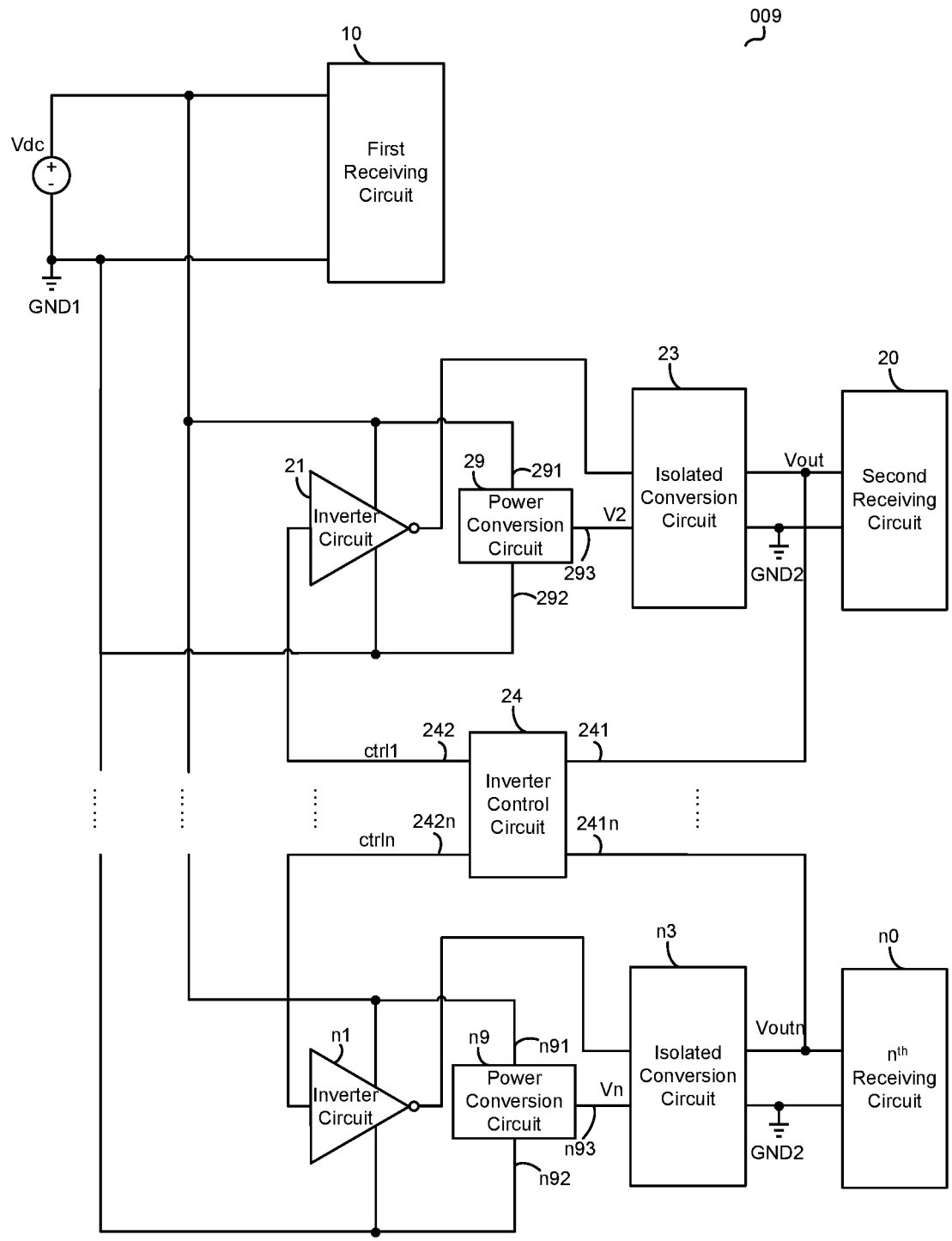
FIG. 11 schematically illustrates a circuit block of an isolated power supply circuit 009 according to an embodiment of the present invention.

FIG. 11 schematically illustrates a circuit block of an isolated power supply circuit 009 according to an embodiment of the present invention. Differences between the isolated power supply 009 illustrated in FIG. 11 and the isolated power supply circuit 007 illustrated in FIG. 9 are shown as below. The isolated power supply 009 illustrated in FIG. 11 comprises the power conversion circuit 29, wherein the power conversion circuit 29 is configured to produce the second power supply signal V2 according to the first power signal Vdc. The power conversion circuit 29 comprises the first input terminal 291, the second input terminal 292 and the output terminal 293. Wherein the first input terminal 291 is coupled to the first terminal of the power source P1 to receive the first power signal Vdc. The second input terminal 292 is coupled to the first reference ground GND1 and the second terminal of the power source P1. The output terminal 293 is coupled to the second input terminal of the isolated conversion circuit 23 to output the second power supply signal V2. In the embodiment illustrated in FIG. 11, the first input terminal of the isolated conversion circuit 23 is configured to receive the first inverter signal, the second input terminal of the isolated conversion circuit 23 is configured to receive the power conversion signal V2. The isolated conversion circuit 23 is configured to produce the second power signal Vout according to the second power supply signal V2 and the first inverter signal. The isolated power supply circuit 009 comprises other power conversion circuits besides the power conversion circuit 29, the other power conversion circuits are shown as n9 in FIG. 11, wherein n is a natural number greater than or equal to 3. The power conversion circuit n9 is configured to produce a power conversion signal Vn according to the first power signal Vdc. The power conversion circuit n9 comprises a first input terminal n91, a second input terminal n92 and an output terminal n93. Wherein the first input terminal n91 is coupled to the first terminal of the power source P1 to receive the first power signal Vdc. The second input terminal n92 is coupled to the first reference ground GND1 and the second terminal of the power source P1. The output terminal n93 is coupled to the second input terminal of the isolated conversion circuit n3 to output the power conversion signal Vn. In the embodiment illustrated in FIG. 11, the first input terminal of the isolated conversion circuit n3 is configured to receive the inverter signal of the inverter circuit n1. The second input terminal of the isolated circuit n3 is configured to receive the power conversion signal Vn. The isolated circuit n3 is configured to produce the nth power signal Voutn according to the power conversion signal Vn and the inverter signal of the inverter circuit n1.

Figure 12:
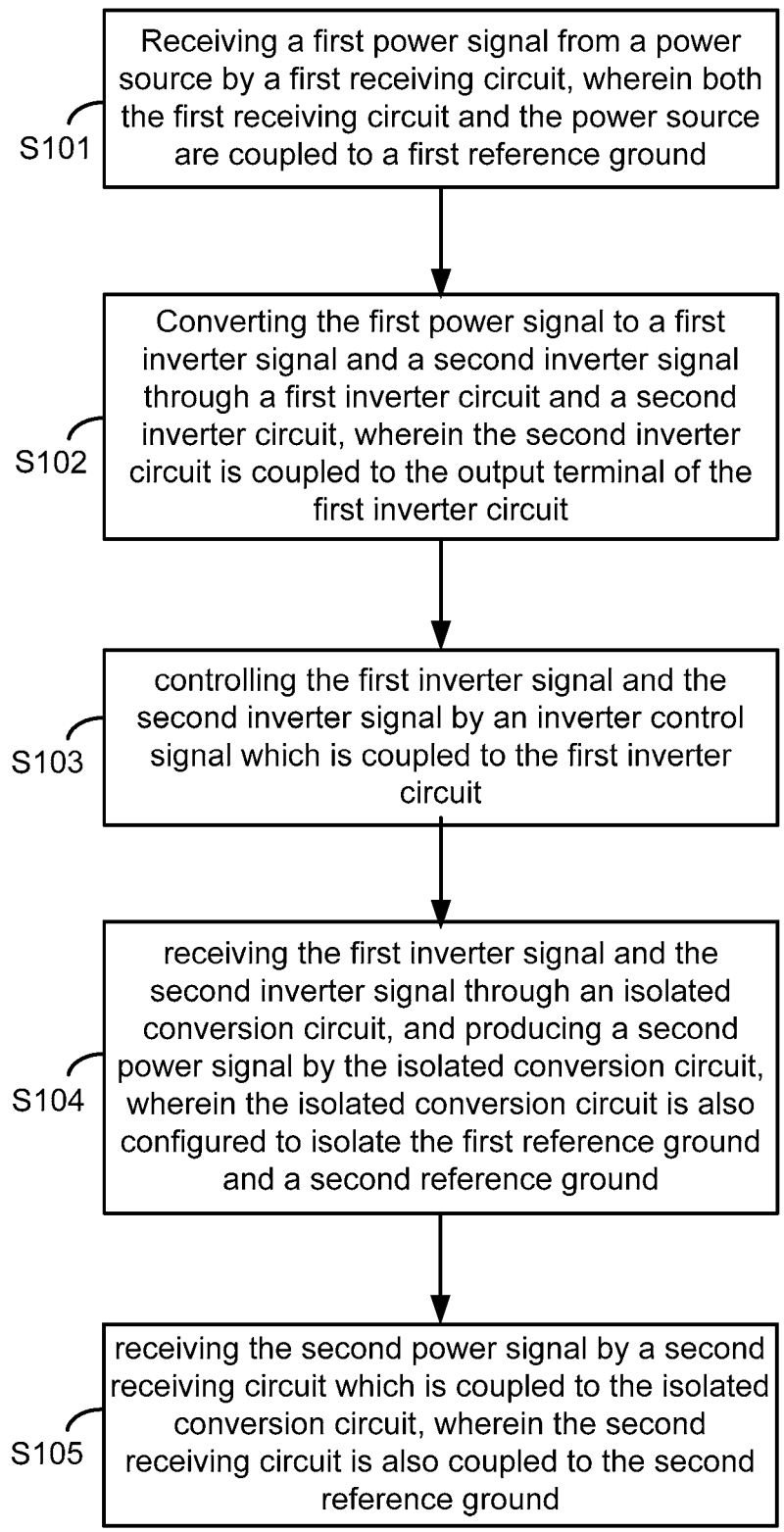
FIG. 12 shows a flow chart of a control method of an isolated power supply circuit according to an embodiment of the present invention.

FIG. 12 shows a flow chart of a control method of an isolated power supply circuit according to an embodiment of the present invention. The method comprises S101-S105.

At the step S101, receiving a first power signal from a power source by a first receiving circuit, wherein both the first receiving circuit and the power source are coupled to a first reference ground;

At the step S102, converting the first power signal to a first inverter signal through a first inverter circuit, and generating a second inverter signal through a second inverter circuit, wherein the second inverter circuit is coupled to the output terminal of the first inverter circuit;

At the step S103, controlling the first inverter signal and the second inverter signal by an inverter control signal which is coupled to the first inverter circuit;

At the step S104, receiving the first inverter signal and the second inverter signal through an isolated conversion circuit, and producing a second power signal by the isolated conversion circuit based on the first inverter signal and the second inverter signal, wherein the isolated conversion circuit is also configured to isolate the first reference ground from a second reference ground;

At the step S105, receiving the second power signal by a second receiving circuit which is coupled to the isolated conversion circuit, wherein the second receiving circuit is also coupled to the second reference ground.

Wherein the inverter control signal is configured to be produced by an inverter control circuit. In one embodiment, the inverter control circuit is coupled between the first inverter circuit and the first reference ground. The inverter control signal is configured to be a square signal. In another embodiment, the inverter control circuit is configured to receive the second power signal and produce the inverter control signal according to the second power signal. In one embodiment, when the second power signal is greater than a preset value, the inverter control signal ctrl is configured to be a fixed value, e.g. digital high or digital low, to control the first inverter signal unchanged, while the second inverter signal is unchanged, and the isolated conversion circuit is configured to stop working. When the second power signal is less than the preset value, the inverter control signal is configured to be a square signal, and the isolated conversion circuit is configured to start working. So that the second power signal is configured to be a steady value with controllable ripple waves.

Figure 13:
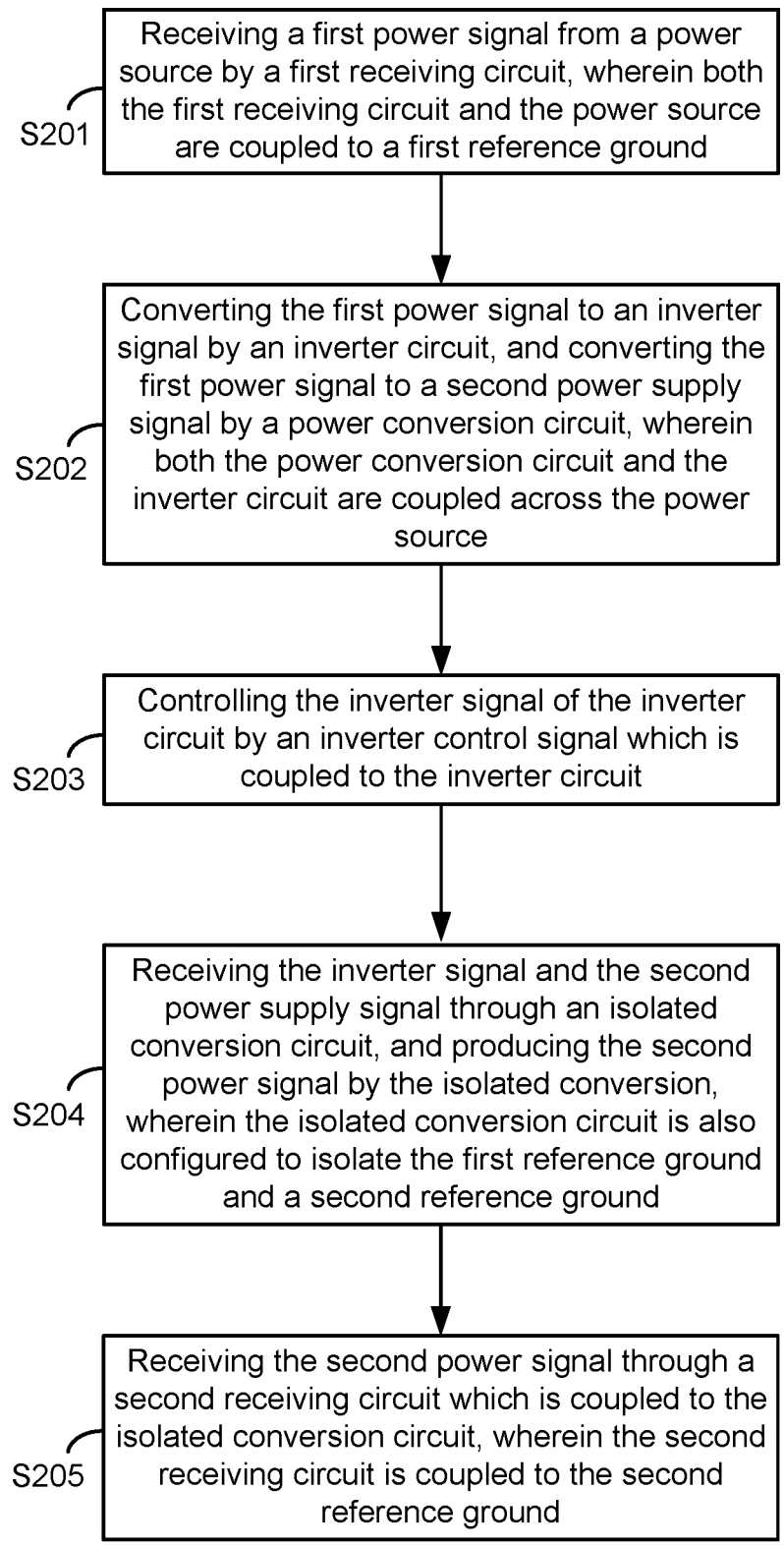
FIG. 13 shows a flow chart of a control method of an isolated power supply circuit according to another embodiment of the present invention.

FIG. 13 shows a flow chart of a control method of an isolated power supply power according to another embodiment of the present invention. The method comprises steps S201-S205:

At the step 201, receiving a first power signal from a power source by a first receiving circuit, wherein both the first receiving circuit and the power source are coupled to a first reference ground;

At the step 202, converting the first power signal to an inverter signal by an inverter circuit, and converting the first power signal to a second power supply signal by a power conversion circuit, wherein both the power conversion circuit and the inverter circuit are coupled across the power source;

At the step 203, controlling the inverter signal of the inverter circuit by an inverter control signal which is coupled to the inverter circuit;

At the step 204, receiving the inverter signal and the second power supply signal through an isolated conversion circuit, and producing the second power signal by the isolated conversion, wherein the isolated conversion circuit is also configured to isolate the first reference ground from a second reference ground;

At the step 205, receiving the second power signal through a second receiving circuit which is coupled to the isolated conversion circuit, wherein the second receiving circuit is coupled to the second reference ground.

Wherein the inverter control signal is configured to be produced by an inverter control signal. In one embodiment, the inverter control circuit is coupled between the first inverter circuit and the first reference ground. The inverter control signal can be a square signal. In another embodiment, the inverter control circuit is configured to receive the second power signal and produce the inverter control signal according to the second power signal. In one embodiment, when the second power signal is greater than a preset value, the inverter control signal is configured to be a fixed value, e.g. digital high or digital low, to control the inverter signal unchanged, and the isolated conversion circuit is configured to stop working. When the second power signal is less than the preset value, the inverter control signal is configured to be a square signal, and the isolated conversion circuit is configured to start working. So that the second power signal is configured to be a steady value with controllable ripple waves.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. An isolated power supply circuit, comprising:
a first reference ground;
a second reference ground, wherein the first reference ground and the second reference ground are isolated from each other;
a power source, configured to provide a first power signal, and the power source comprises a first terminal and a second terminal, wherein the second terminal is coupled to the first reference ground;
a first inverter circuit, comprising a first input terminal, a second input terminal, a third input terminal and an output terminal, wherein the first input terminal is configured to receive an inverter control signal, the second input terminal is coupled to the first terminal of the power source to receive the first power signal, the third input terminal is coupled to the first reference ground and the second terminal of the power source, and wherein the inverter control signal is inverted by the first inverter circuit to provide a first inverter signal at the output terminal;
a second inverter circuit, comprising a first input terminal, a second input terminal, a third input terminal and an output terminal, wherein the first input terminal of the second inverter circuit is coupled to the output terminal of the first inverter circuit to receive the first inverter signal, the second input terminal of the second inverter circuit is coupled to the first terminal of the power source, the third input terminal of the second inverter circuit is coupled to the second terminal of the power source, and wherein the first inverter signal is inverted by the second inverter circuit to provide a second inverter signal at the output terminal;

an isolated conversion circuit, configured to provide a second power signal according to the first inverter signal and the second inverter signal, and the isolated conversion circuit is configured to isolate the first reference ground from the second reference ground; and a first receiving circuit, comprising a first terminal and a second terminal, wherein the first terminal of the first receiving circuit is configured to receive the second power signal, and the second terminal of the first receiving circuit is coupled to the second reference ground.

2. The isolated power supply circuit of claim 1, further comprising:

a second receiving circuit, comprising a first terminal and a second terminal, wherein the first terminal of the second receiving circuit is coupled to the first terminal of the power source to receive the first power signal, and the second terminal of the second receiving circuit is coupled to the first reference ground and the second terminal of the power source.

3. The isolated power supply circuit of claim 1, wherein the isolated conversion circuit further comprises:

an isolated circuit, configured to isolate the first reference ground from the second reference ground, and the isolated circuit comprises a first input terminal, a second input terminal, a first output terminal and a second output terminal, wherein the first input terminal is coupled to the output terminal of the first inverter circuit to receive the first inverter signal, the second input terminal is coupled to the output terminal of the second inverter circuit to receive the second inverter signal; and a rectifier circuit, coupled to the isolated circuit to receive an output signal of the isolated circuit, and the rectifier circuit is configured to provide the second power signal by rectifying the output signal of the isolated circuit.

4. The isolated power supply circuit of claim 3, wherein the isolated circuit further comprises:

a first capacitor, comprising a first terminal and a second terminal, wherein the first terminal of the first capacitor is coupled to the output terminal of the first inverter circuit, and the second terminal of the first capacitor is coupled to the first input terminal of the rectifier circuit; and a second capacitor, comprising a first terminal and a second terminal, wherein the first terminal of the second capacitor is coupled to the output terminal of the second inverter circuit, and the second terminal of the second capacitor is coupled to the rectifier circuit.

5. The isolated power supply circuit of claim 3, wherein the isolated circuit further comprises:

an isolated transformer, coupled between the first inverter circuit and the rectifier circuit, and coupled between the second inverter circuit and the rectifier circuit, wherein the isolated transformer is configured to isolate the first reference ground from the second reference ground.

6. The isolated power supply circuit of claim 3, the rectifier circuit comprises:

a first diode, having an anode and a cathode, wherein the anode is coupled to the first output terminal of the isolated circuit, and the cathode is coupled to the first terminal of the first receiving circuit;

a second diode, having an anode and a cathode, wherein the anode is coupled to the second output terminal of the isolated circuit, and the cathode is coupled to the first terminal of the first receiving circuit;

a third diode, having an anode and a cathode, wherein the anode is coupled to the second reference ground, and the cathode is coupled to the anode of the second diode and the second output terminal of the isolated circuit; and a fourth diode, having an anode and a cathode wherein the anode is coupled to the second reference ground, and the cathode is coupled to the anode of the first diode and the first output terminal of the isolated circuit.

7. The isolated power supply circuit of claim 1, further comprising:

an inverter control circuit, coupled between the first inverter circuit and the first reference ground, configured to provide an inverter control signal to control the first inverter signal.

8. The isolated power supply circuit of claim 1, further comprising:

an inverter control circuit, coupled between the first inverter circuit and the first receiving circuit, configured to provide an inverter control signal according to the second power signal, wherein the inverter control signal is configured to control the first inverter signal.

9. The isolated power supply circuit of claim 8, wherein:

when the second power signal is greater than a preset value, the inverter control signal is configured to be high or low to control the first inverter signal unchanged, and the isolated conversion circuit is configured to stop working; and when the second power signal is less than the preset value, the inverter control signal is configured to be a square signal, and the isolated conversion circuit is configured to start working.

10. An isolated power supply circuit, comprising:

a first reference ground;

a second reference ground, wherein the first reference ground and the second reference ground are isolated from each other;

a power source, configured to provide a first power signal, and the power source comprises a first terminal and a second terminal, wherein the second terminal is coupled to the first reference ground;

an inverter circuit, coupled between the power source and the first reference ground, and the inverter circuit is configured to receive the first power signal and an inverter control signal, and to provide an inverter signal based on the first power signal and the inverter control signal, wherein the inverter control signal is inverted by the inverter circuit to output the inverter signal;

a power conversion circuit, coupled between the power source and the first reference ground, and the power conversion circuit is configured to convert the first power signal to a power supply signal, an isolated conversion circuit, configured to provide a second power signal according to the power supply signal and the inverter signal of the first power signal, and the isolated conversion circuit is configured to isolate the first reference ground from the second reference ground; and a receiving circuit, comprising a first terminal and a second terminal, wherein the first input terminal of the receiving circuit is configured to receive the second power signal, and the second terminal of the receiving circuit is coupled to the second reference ground; wherein when the second power signal is greater than a preset value, the inverter control signal is configured to be high or low to control the inverter signal from changing, and when the second power signal is less than the preset value, the inverter control signal is configured to be a square signal.

11. The isolated power supply circuit of claim 10, wherein the isolated conversion circuit further comprises:
an isolated circuit, configured to isolate the first reference ground from the second reference ground, and the isolated circuit comprises a first input terminal, a second input terminal, a first output terminal and a second output terminal, wherein the first input terminal is coupled to an output terminal of the inverter circuit, and the second input terminal is coupled to an output terminal of the power conversion circuit; and
a rectifier circuit, coupled to the isolated circuit to receive an output signal of the isolated circuit, and the rectifier circuit is configured to output the second power signal by rectifying the output signal of the isolated circuit, wherein the rectifier circuit comprises a first input terminal, a second input terminal, a first output terminal and a second output terminal, wherein the first input terminal of the rectifier circuit is coupled to the first output terminal of the isolated circuit, the second input terminal of the rectifier is coupled to the second output terminal of the isolated circuit, the first output terminal of the rectifier circuit is coupled to the first terminal of the receiving circuit, and the second output terminal of the rectifier circuit is coupled to the second terminal of the receiving circuit.

12. The isolated power supply circuit of claim 11, wherein the isolated circuit further comprises:
a first capacitor, comprising a first terminal and a second terminal, wherein the first terminal of the first capacitor is coupled to an output terminal of the inverter circuit, and the second terminal of the first capacitor is coupled to the first input terminal of the rectifier circuit; and
a second capacitor, comprising a first terminal and a second terminal, wherein the first terminal of the second capacitor is coupled to an output terminal of the power conversion circuit, and the second terminal of the second capacitor is coupled to the second input terminal of the rectifier circuit.

13. The isolated power supply circuit of claim 11, wherein the isolated circuit further comprises:
an isolated transformer, comprising a first input terminal, a second input terminal, a first output terminal and a second output terminal, wherein the first input terminal of the isolated transformer is coupled to an output terminal of the inverter circuit, the second input terminal of the isolated transformer is coupled to an output terminal of the power conversion circuit, the first output terminal of the isolated transformer is coupled to the first input terminal of the rectifier circuit, and the second output terminal of the isolated transformer is coupled to the second input terminal of the rectifier circuit.

14. The isolated power supply circuit of claim 11, wherein the rectifier circuit further comprises:
a first diode, having an anode and a cathode, wherein the anode is coupled to the first output terminal of the isolated circuit, the cathode is coupled to the first input terminal of the receiving circuit;
a second diode, having an anode and a cathode, wherein the anode is coupled to the second output terminal of the isolated circuit, the cathode is coupled to the first input terminal of the receiving circuit;

a third diode, having an anode and a cathode wherein the anode is coupled to the second reference ground, the cathode is coupled to the anode of the second diode and the second output terminal of the isolated circuit; and
a fourth diode, having an anode and a cathode, wherein the anode is coupled to the second reference ground, the cathode is coupled to the anode of the first diode and the first output terminal of the isolated circuit.

15. The isolated power supply circuit of claim 10, further comprising:
an inverter control circuit, coupled between the inverter circuit and the first reference ground, and the inverter control circuit is configured to provide an inverter control signal to control the inverter circuit.

16. The isolated power supply circuit of claim 10, further comprising:
an inverter control circuit, coupled between the inverter circuit and the receiving circuit, wherein the inverter control circuit is configured to provide an inverter control signal according to the second power signal, and the inverter control signal is configured to control the inverter signal of the first power signal.

17. A control method for an isolated power supply circuit, wherein the isolated power supply circuit comprises a first reference ground, a second reference ground, a power source configured to provide a first power signal and a receiving circuit, the control method comprising:
receiving the first power signal from the power source by the receiving circuit, wherein both the receiving circuit and the power source are coupled to the first reference ground;
converting the first power signal and an inverter control signal to a first inverter signal by a first inverter circuit, and generating a second inverter signal by a second inverter circuit based on the first inverter signal, wherein the second inverter circuit is coupled to an output terminal of the first inverter circuit to receive the first inverter signal, wherein the inverter control signal is inverted by the first inverter circuit to output the first inverter signal, and the first inverter signal is inverted by the second inverter circuit to output the second inverter signal;
controlling the first inverter signal and the second inverter signal by the inverter control signal; and
receiving the first inverter signal and the second inverter signal through an isolated conversion circuit which is coupled to the first inverter circuit, and producing a second power signal by the isolated conversion circuit based on the first inverter signal and the second inverter signal;
wherein the isolated conversion circuit is also configured to isolate the first reference ground from a second reference ground.

18. The control method of claim 17, wherein the inverter control signal is based on the second power signal.

19. The control method of claim 18, wherein:
when the second power signal is greater than a preset value, the inverter control signal is configured to be high or low to control the first inverter signal unchanged; and
when the second power signal is less than the preset value, the inverter control signal is configured to be a square signal.

* * * * *